United States Patent [19]
Hayter et al.

[11] Patent Number: 5,577,035
[45] Date of Patent: Nov. 19, 1996

[54] APPARATUS AND METHOD OF PROCESSING BANDWIDTH REQUIREMENTS IN AN ATM SWITCH

[75] Inventors: Andrew T. Hayter, Bitterne Park; Simon P. Davis, Romsey, both of England

[73] Assignee: Roke Manor Research Limited, Hampshire, Great Britain

[21] Appl. No.: 408,344

[22] Filed: Mar. 22, 1995

[30]  Foreign Application Priority Data

Mar. 23, 1994 [GB] United Kingdom ............... 9405704

[51] Int. Cl.$^6$ .................................................. H04L 12/56
[52] U.S. Cl. ........................................ 370/60; 370/94.1
[58] Field of Search ............................ 370/17, 60, 60.1, 370/61, 79, 85.6, 94.1, 94.2

[56]  References Cited

U.S. PATENT DOCUMENTS

| | | | |
|---|---|---|---|
| 5,179,556 | 1/1993 | Turner. | |
| 5,241,536 | 8/1993 | Grimble et al. | 370/94.1 X |
| 5,444,702 | 8/1995 | Burnett et al. | 370/60.1 |
| 5,448,559 | 9/1995 | Hayter et al. | 370/60.1 |
| 5,475,679 | 12/1995 | Munter | 370/60.1 X |

FOREIGN PATENT DOCUMENTS

| | | |
|---|---|---|
| WO86/02510 | 4/1986 | WIPO. |
| WO92/10898 | 6/1992 | WIPO. |
| WO93/07699 | 4/1993 | WIPO. |

Primary Examiner—Melvin Marcelo
Attorney, Agent, or Firm—Hill, Steadman & Simpson

[57] ABSTRACT

An ATM communication system including an ATM switch having input and output ports is provided. Each input port is fed from an input port server and each of the output ports are arranged to feed an output port server. The input port servers include buffer stores, one for each of the output ports, to which data is transmitted through the switch. Each buffer store in the input port servers is arranged to interrogate the output ports server, with which it communicates before the transmission of data, to determine whether the output port server data handling capacity is available. The ATM communication system includes a transmitting devices for unicast traffic and multicast traffic. The transmitting device includes an output time slot control device and a scheduling device arranged to allocate a time slot for the transmission of each unicast traffic cell, and for calculating when a time slot is available for transmission of a multicast traffic cell. The output time slot control device includes a store for storing information identifying the time slot and for reserving that time slot for the transmission of a multicast traffic cell.

4 Claims, 9 Drawing Sheets

OUTPUT TIME-SLOT CONTROL
|   | N tx | L tx | RATE  |
|---|------|------|-------|
| A |      | 1    | 0.125 |
| B | 10   | 2    | 0.125 |
| C | 7    | 3    | 0.25  |
| D | 14   | 4    | 0.1   |
| E |      |      | 0.0   |
N tx = NEXT TRANSMISSION TIME
L tx = LAST TRANSMISSION TIME
*Fig. 5*
CELL TIMING SEQUENCE
| A | B | C | D |   |   | C |   | A | B | C |    |    |    | D | C |    |
|---|---|---|---|---|---|---|---|---|---|---|----|----|----|---|---|----|
| 1 | 2 | 3 | 4 | 5 | 6 | 7 | 8 | 9 | 10| 11| 12 | 13 | 14 | 15| 16| 17 |
*Fig. 6*
| ATM CELL | B C D | MULTICAST CELL
*Fig. 7*
  
PROCESS    INPUT/OUTPUT
     *Fig. 9*
DECISION   START
  
END        OFF PAGE CONNECTOR

APPARATUS AND METHOD OF PROCESSING BANDWIDTH REQUIREMENTS IN AN ATM SWITCH

BACKGROUND OF THE INVENTION

1. Field of the Invention

The present invention generally relates to an apparatus and a method of processing bandwidth requirements in an asynchronous transfer mode (ATM) switch.

More particularly, the invention relates to an apparatus and method of processing bandwidth requirements in an ATM switch to solve the problem of efficiently allocating resources where a multiplexed stream of ATM cells are to be individually switched to different physical ports.

2. Description of the Related Art

ATM traffic is predominantly bursty data traffic, although speech traffic may be included. By its nature, bursty traffic requires high bandwidths for part of the time and little or no bandwidth at others. In order to efficiently use the bandwidth available, it is necessary to allocate the bandwidth using each source's mean bandwidth requirement and not peak bandwidth. If mean bandwidth allocation is used, the total peak bandwidth of all the sources may thus be greater than the pipe bandwidth available.

Data destined for a particular output port will enter the switch from many different input ports. The total instantaneous data rate across the switch may be greater than the output port can sustain, thus buffering and eventual loss of data due to buffer overflow may occur. To reduce this probability to an operationally acceptable level results in a low utilization of the switch which is unacceptable. A dynamic bandwidth allocation (DBA) protocol, described in co-pending, patent application GB 9322744.5 provides a method of allocating bandwidth by sending requests for bandwidth to the required output port and sending data only when bandwidth has been allocated by an acknowledgement message.

Handling statistically multiplexed bursty data services and handling multicasting traffic are probably two of the most complex tasks to perform in an ATM switch. Most multicasting solutions require an ATM switch core speedup, a copy network or usually both. These methods are inefficient and do not lend themselves to bursty traffic.

The dynamic bandwidth allocation (DBA) protocol was designed to encapsulate an ATM switch to offer statistical multiplexing of bursty data services by offering a fair method of sharing bandwidth between cells destined for different outputs and by storing in a queue data which cannot be transferred immediately across the switch. Multicast traffic may also utilize components of the DBA protocol, but a new approach must be used.

SUMMARY OF THE INVENTION

It is an object of the present invention to provide an apparatus and a method for processing bandwidth requirements which solves the problem of statistically multiplexed multicast traffic at a multiplexing point.

To this end, the present invention provides an ATM communication system comprising an ATM switch having a plurality of input ports and a plurality of output ports. Each of the input ports is fed from an input port server, and each of the output ports is arranged to feed an output port server. The input port servers have a plurality of buffer stores, one for each of the output ports, to which said output ports data is transmitted through the switch. Each buffer store in the input port servers is arranged to interrogate the output ports server with which it communicates before the transmission of data to thereby determine whether output ports server data handling capacity is available. The ATM communication system includes means for causing unicast traffic and multicast traffic to be transmitted through the switch in an appropriate time slot.

The means for causing unicast traffic and multicast traffic to be transmitted through the switch may include output time slot control means and scheduling means arranged to allocate a time slot for the transmission of each unicast traffic cell and for calculating when a time slot is available for the transmission of a multicast traffic cell.

The output time slot control means includes a storage arrangement for storing information identifying the time slot and for reserving the time slot for the transmission of a multicast traffic cell.

The method of processing the bandwidth requirements comprises the steps of:

(a) scheduling a time slot for the transmission of each unicast traffic cell, (b) calculating when a time slot is available for the transmission of a multicast traffic cell, (c) storing the identity of the time slot available for a multicast traffic cell to reserve that time slot for multicast traffic, and (d) transmitting the unicast and multicast traffic cells across the switch in their respective time slots.

An embodiment of the present invention will now be described with reference to the accompanying drawings.

BRIEF DESCRIPTION OF THE DRAWINGS

FIG. 5 is a table showing output time slot control of the present invention of the present invention.

FIG. 6 shows a cell timing sequence of the present invention.

FIG. 7 shows a typical multicast cell with an associated multicast group of the present invention.

FIG. 9 shows the symbols used in the flow diagrams of the present invention.

DETAILED DESCRIPTION OF THE PREFERRED EMBODIMENTS

The following description refers to shapers which are described in greater detail in co-pending patent application published under number GB 2268372A.

Figure 1:
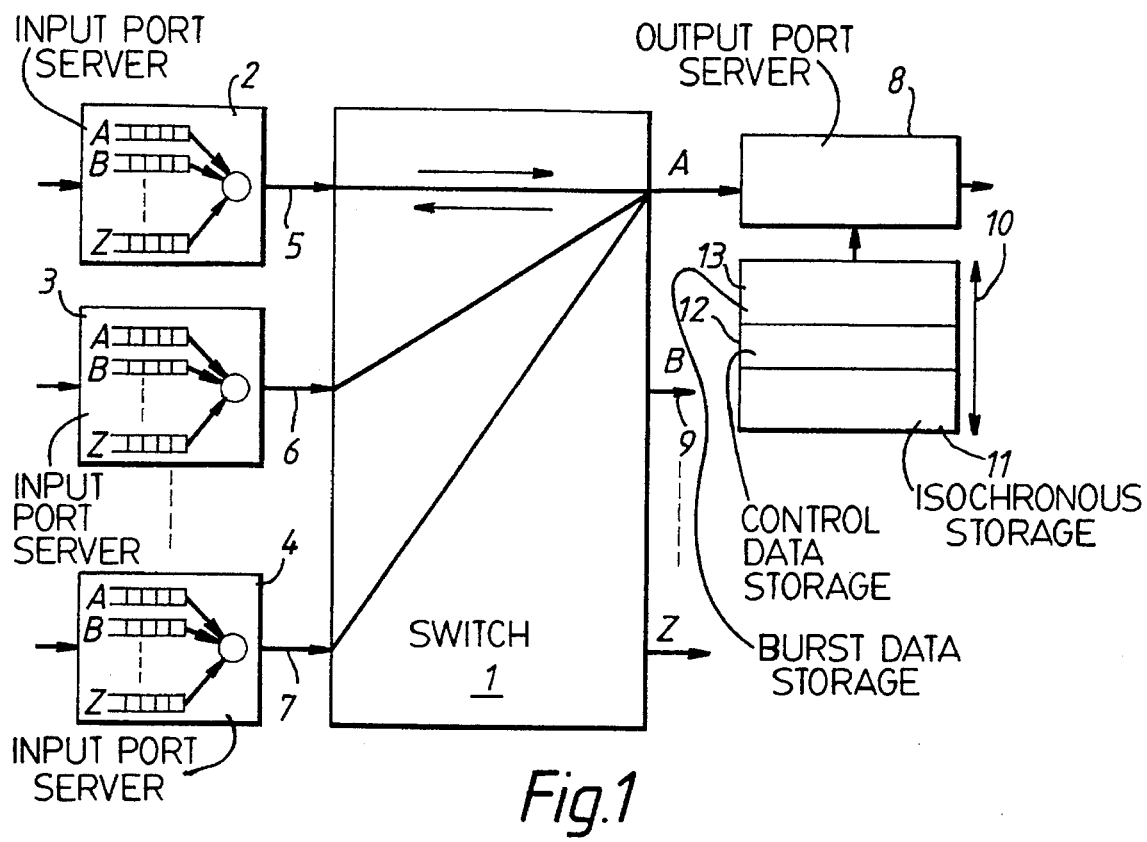
FIG. 1 is a schematic block diagram of a switch having associated input port servers and output port servers of the present invention.

Referring now to FIG. 1, an ATM communication system comprises a switch 1 which is fed from servers 2, 3 and 4 via input lines 5, 6 and 7 respectively. The input port servers 2, 3 and 4 are arranged to feed a plurality of output port servers one only of which is shown having reference numeral 8. It will be appreciated that in practice a large number of input port servers may be provided, and by the same token, a very large number of output port servers will be provided which are placed in communication with the input port servers via the switch 1. In the present arrangement each input port server is provided with a plurality of buffer stores (also referred to hereinafter as shaper queues or shapers) A, B . . . Z, one for each of the output port servers such as the output port server 8. Thus, it will be apparent that signals in the input port buffers A of the input port servers 3 and 4 will be routed via the switch 1 to the output port server 8. Similarly, signals in the buffers B of the input port servers 2, 3 and 4 will be routed to the line 9 for a corresponding output port server not shown. Thus with this arrangement it will be appreciated that if the servers 2, 3 and 4 each demand access to the output port server A, an overload condition can occur which may mean that data is lost.

In order to avoid this situation it is arranged that, before data is transmitted, a request is transmitted which must be appropriately acknowledged. Thus, in one specific case, if data is to be transmitted from buffer store A in the input server 2 to the output port server 8, a request transmission is made from the input port server 2 to the output port server 8. If there is available data capacity, then an acknowledgement signal is transmitted from the output port server 8 to input port server 2 indicating that data can be transferred therebetween.

As shown schematically in FIG. 1, a total output port bandwidth may be available as indicated by the arrow 10 comprising: an isochronous portion of storage 11 for essential data which must be transmitted without undue delay, a control data storage portion 12 for control data and a further storage portion 13 for bursty data. Thus, provided space is available in the output port server 8 in an appropriate one of the storage portions 11, 12 or 13, a positive acknowledgement will be sent across the switch 1 which will result in subsequent data transfer.

Figure 2:
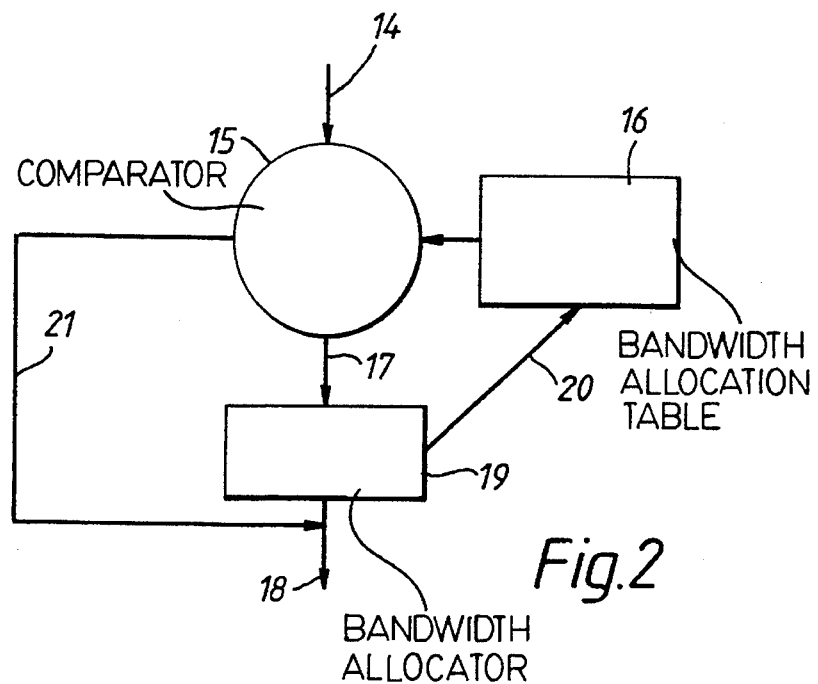
FIG. 2 is a block diagram indicating a bandwidth allocation mechanism of the present invention.

The mechanism for handling a bandwidth request is shown in FIG. 2 and upon receipt of a bandwidth request on a line 14, a comparison is made in a comparator 15 with the available bandwidth which is stored in a bandwidth allocation table 16. If sufficient bandwidth is not available, a signal is sent via a line 17 to provide a positive acknowledgement on a line 18 from a bandwidth allocator 19 which also provides a feedback signal via a line 20 to update the bandwidth allocation table 16. If sufficient bandwidth is available to meet the request on the line 14, a signal is sent via a line 21 which rejects the request and a negative acknowledgement signal is provided via the line 18.

The amount of bandwidth requested may be determined depending upon the anticipated mean frame size. Each frame normally comprises a number of cells, each cell having a predetermined quantity of data contained therein. In one arrangement, the last cell of each frame includes an end of frame marker and upon transmission of the next consecutive cell following an end of frame marker, a bandwidth request is made corresponding to the mean frame bandwidth.

Figure 3:
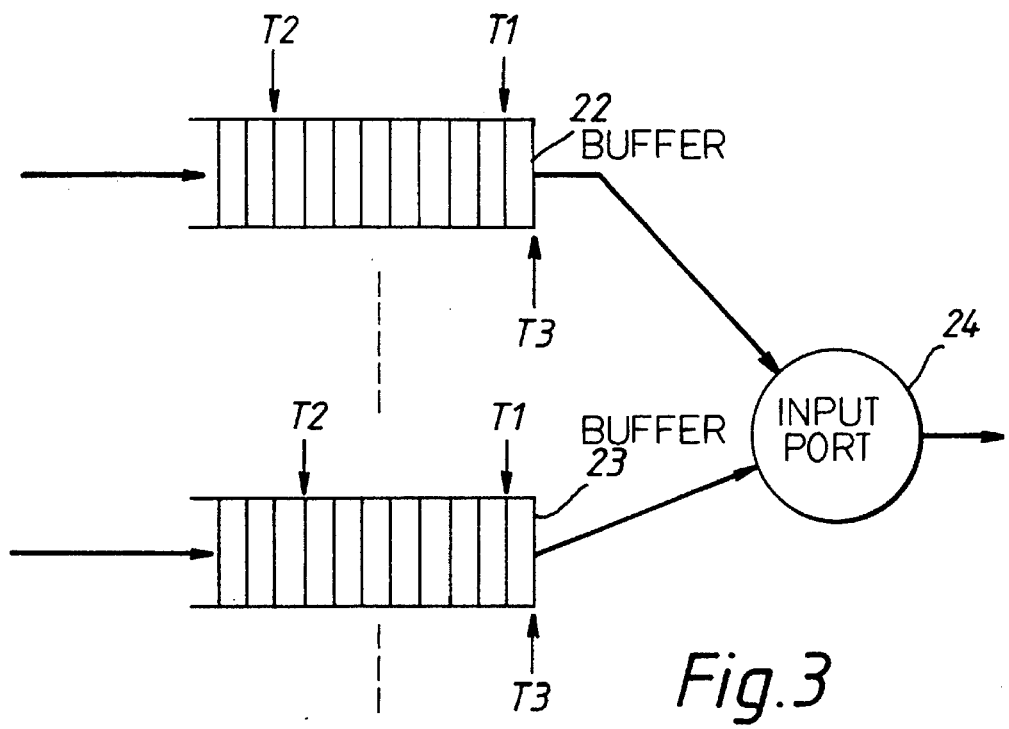
FIG. 3 is a block schematic diagram of buffer stores embodying a plurality of thresholds of the present invention.

In an alternative embodiment, as shown in FIG. 3, each buffer such as buffers 22 and 23 of an input port server which is arranged to communicate with an input port 24, has three thresholds T1, T2 and T3. In operation of the system, a bandwidth request is arranged to the transmitted as each threshold is reached, but as will be appreciated, the bandwidth requested will be determined by the quantity of data to be transmitted and thus bandwidth will not be reserved unnecessarily.

In arrangements as just described, a dynamic bandwidth allocation protocol will operate between an input port server and another server on a desired switch output port. The server on the output port maintains, in effect, a table containing data relating to the current bandwidth reserved for that output. When an input port server requires to send a burst, it thus first sends a reservation across the switch network to the output port server. The reservation cell contains the requested bandwidth. If the output port server can accept the requested bandwidth, a positive acknowledgement cell is sent back to the requested input port server. At this point the data burst can be sent from the input port to the output port. The bandwidth is deallocated on completion of the burst transmission by means of an explicit clear down signal. The system as just described, in effect, comprises a dynamic reservation protocol wherein only one multiplexing point is involved. Thus, coupled with the data service tolerance of delays of tens of milliseconds and the fact that requests could be queued if blocking occurs rather than re-sent, a very large burst blocking probability (BPP) of say 0.9 or higher could be used. This would also increase performance for a highly bursty high peak bit rate data service.

Figure 4:
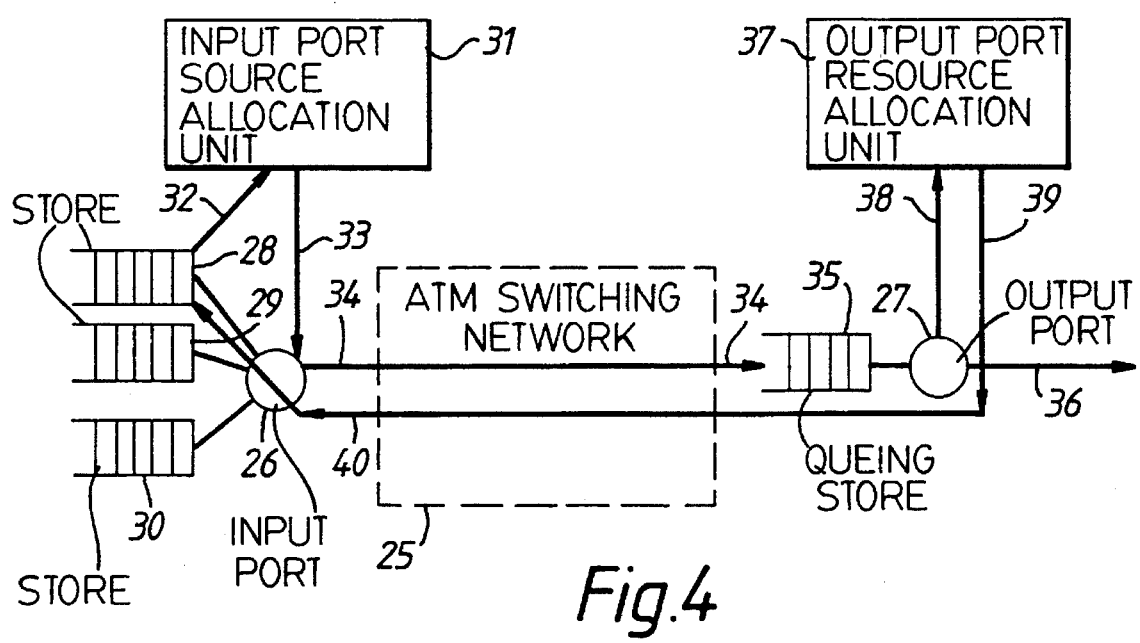
FIG. 4 is a schematic block diagram of a further embodiment of part of an ATM communication system of the present invention.

Referring now to FIG. 4, the part of the ATM system under consideration comprises an ATM switching network 25 which is arranged in communication with an input port 26 and an output port 27. It will of course be appreciated that although only one input port and one output port are shown, there will be a plurality of input ports and a plurality of output ports. Data is fed to the input port 26 from a number of different sources which are arranged to feed stores 28, 29 and 30, one store for each source. Although only three stores 28, 29 and 30 are shown in the drawing, many more sources may be arranged to communicate with the port 26 each via a separate store. Data fed to the stores 28, 29 and 30 is obviously transmitted in the form of ATM cells which may include control signals as well as data.

Since there is a maximum available bandwidth in the communication link between the input port 26 and the output port 27 across the switching network 25, a situation can arise where if a large number of stores such as the stores 28, 29 and 30 require access, the available bandwidth may be exceeded. Accordingly, an input port source allocation unit 31 is provided which checks the current use of the available bandwidth by the sources appertaining to the stores 28, 29 and 30, and assesses bandwidth requests received from the store as illustrated schematically by an arrow 32. The requests received may be modified in accordance with bandwidth available. Thus, a request from the store 28 for a predetermined bandwidth may be modified in the input resource allocation unit 31, and the modified request will be passed via a line 33 to the input port 26 for onward transmission via the switching network 25 on a line 34 which is a schematic illustration of the route. The route through the switch will be occupied by bandwidth requests and data.

Bandwidth requests are fed via the line 34 to a queuing store arrangement 35, whereas data will by-pass the queuing arrangement and pass through the system and out of the output port 27 on a line 36. Bandwidth available at the output port 27 is assessed by an output port resource allocation unit 27 which monitors the bandwidth currently used by the output port via a line 38 and provides acknowledgement signals via a line 39 which are returned through the switching network 25 and a line 40 to the source making a request.

Thus, in the present example, if the store 28 makes a request over the line 32, the input port resource allocation unit 31 may modify this request which is passed through the switching network via the line 34 and queued in the store 35. The request eventually receives attention by the output port resource allocation unit 37 which serves to provide an appropriate acknowledgement signal via the lines 39 and 40 which serve to release the data from the store at a rate determined in accordance with the bandwidth available.

It will be appreciated that by arranging for bandwidth requests to be queued as hereinbefore described, a more efficient system is provided with less possibility of delays. In addition, the hardware implementations described above can be adapted to handle multicast traffic.

Referring to FIG. 5, five shaper queues A–E, for example, are shown. Of these A–D have unicast cells queued and rates to transmit them. This is shown in the Output Time Slot Control box under the column Ltx. The rates are given as a fraction of the total available rate (which is 1). An example of the cell timing sequence for these rates is shown in FIG. 6.

A Forward Multicast List comprises a list of required outputs for each multicast cell for the first K multicast cells. From the Forward Multicast List of cells, there is just one cell currently in the queue, and it requires a cell bandwidth from shapers B, C and D shown in FIG. 7.

Figure 8:
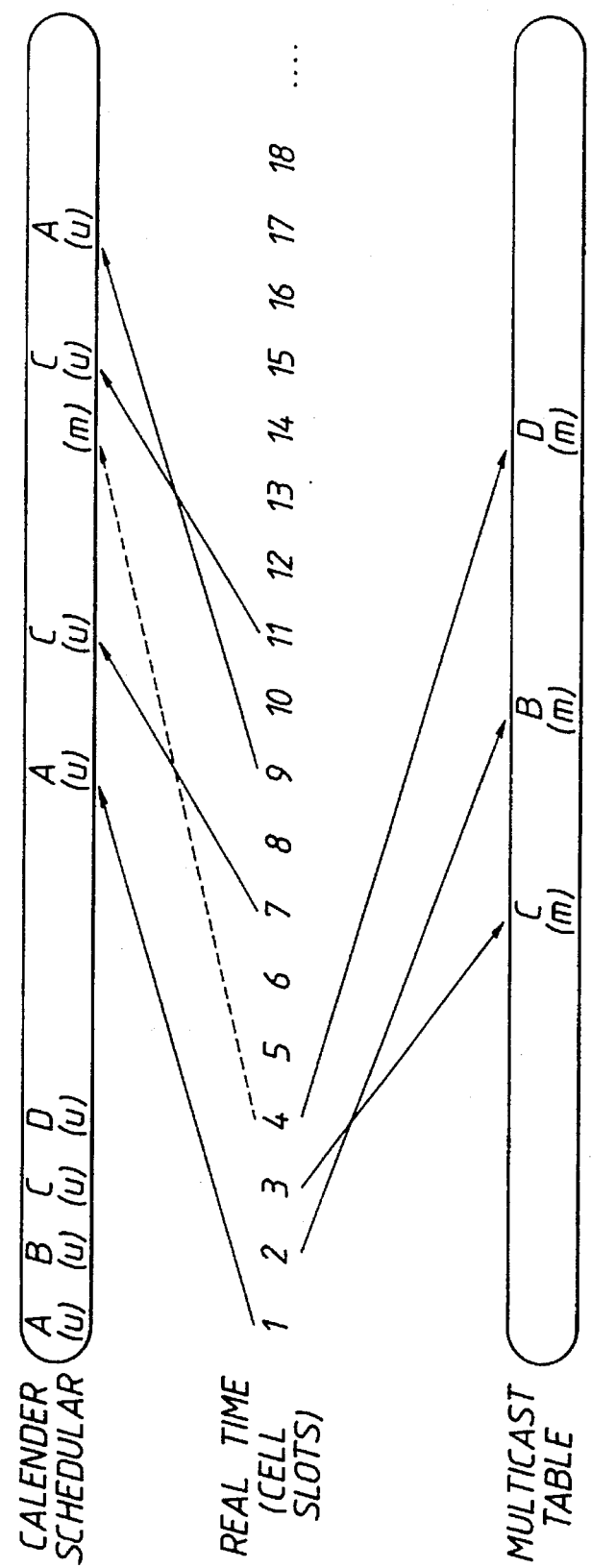
FIG. 8 shows how multicast traffic is scheduled in the present invention.

FIG. 8 shows an illustration of the scheduling of cell sending opportunities for both the calendar and the table values Ntx derived from the rates provided in FIG. 5. By taking the cell timing sequence in FIG. 6 and applying it to the scheduling diagram in FIG. 8, the method of handling multicast can be seen to be:

| TIME SLOT | PROCESS |
|---|---|
| 1 | Unicast cell from shaper A transmitted, schedule unicast cell from shaper A on the calendar at time slot 9. |
| 2 | Unicast cell from shaper B transmitted, use next cell opportunity for multicast cell, calculate next cell timing opportunity and store in the Ntx(B) table as time slot 10. |
| 3 | Unicast cell from shaper C transmitted, use next cell opportunity for multicast cell, calculate next cell timing, opportunity and store in the Ntx(C) table as time slot 7. |
| 4 | Unicast cell from shaper D transmitted, use next cell opportunity for multicast cell, calculate next cell timing opportunity and store in the Ntx(D) table as time slot 14. Schedule multicast cell for transmission at cell slot 14. |
| 5 | |
| 6 | |
| 7 | Real time = Ntx(C) time.. schedule unicast cell on the calendar at cell slot I 1. |
| 8 | |
| 9 | Unicast cell from shaper A transmitted, schedule unicast cell from shaper A on the calendar at time slot 17. |
| 10 | Real time = Ntx(B) time, schedule unicast cell on the calendar at cell slot 18. |
| 11 | Unicast cell from shaper C transmitted, schedule unicast cell from shaper C on the calendar at time slot 15. |
| 12 | |
| 13 | |
| 14 | Transmit multicast cell. Real time = Ntx(D) time, schedule unicast cell on the calendar at cell slot 24. |

From this table, it can be seen that unicast traffic is scheduled using the calendar scheduler without any chance from the previous implementation of the scheduler. The sending of a unicast cell results in the scheduling of the next calendar event for the shaper. However, a multicast cell is scheduled and sent using the calendar, but without causing any further scheduling to occur.

A new structure added to the existing Output Time Slot Control titled Ntx is used instead of the calendar to schedule the next shaper cell sending opportunity when the previous cell bandwidth has been used for multicast cell bandwidth. The scheduling of a shaper cell sending opportunity can occur either from the calendar or the table depending on whether the previous shaper bandwidth was used for a unicast or multicast cell. Further, the two scheduling systems are mutually exclusive; if the next cell is scheduled using one of the two methods, it cannot by implication be scheduled by the other method.

The most comprehensive way of describing the multicast protocol is by the flow diagrams described below. The flow diagrams use the symbols shown in FIG. 9.

Figure 10:
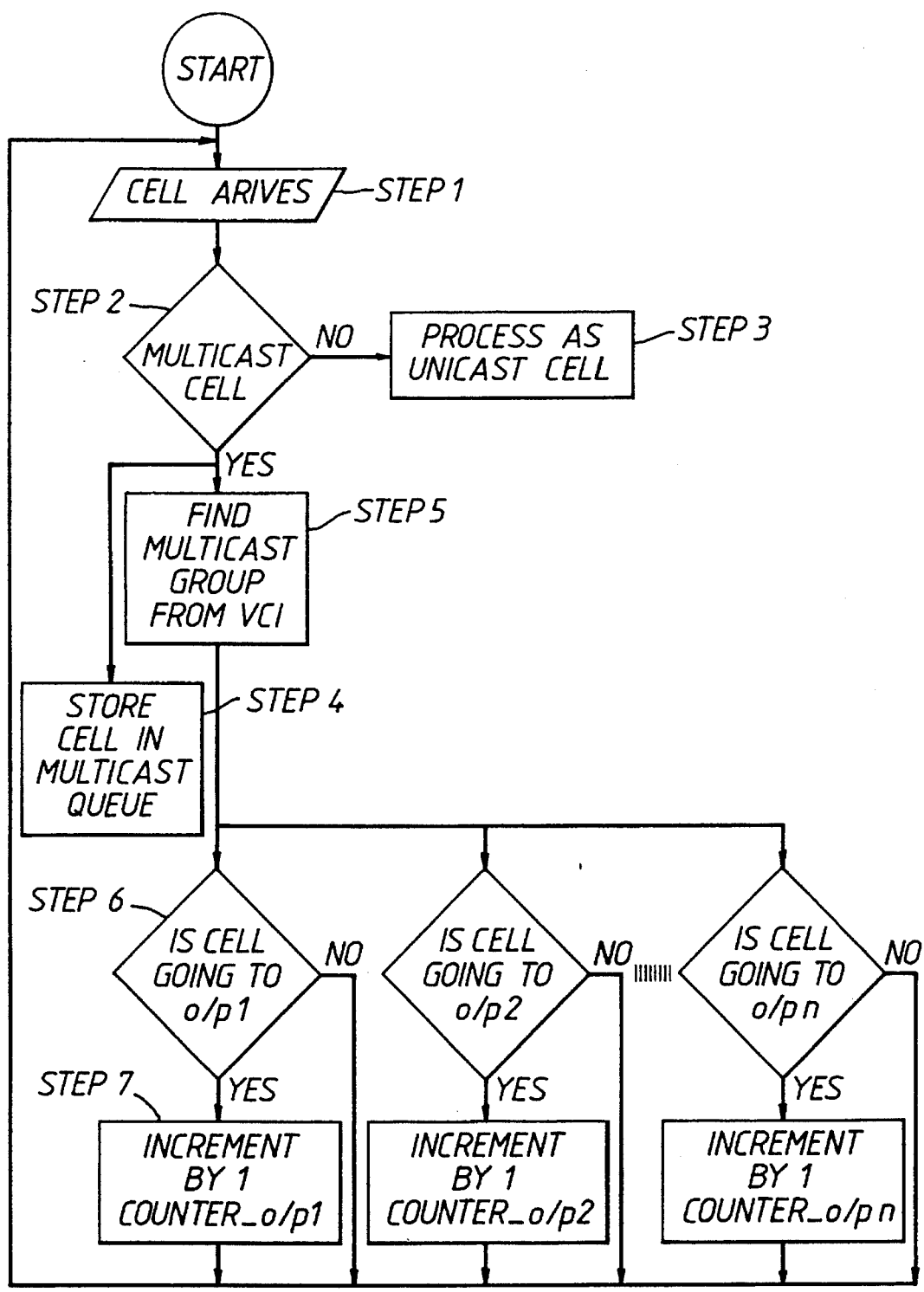
FIG. 10 is a flow diagram showing the cell arrival process of the present invention.

The cell arrival process is shown in FIG. 10. At step 1, a cell arrives at the network side of the switch. In step 2, a decision is made as to whether the cell is a multicast cell or not. If not, then in step 3 the cell is processed as a unicast cell and queued in unicast buffers. If the cell is determined to be a multicast cell, then it is stored, at step 4 in a single separate multicast queue for all multicast traffic arriving at the switch. In step 5, the multicast a roup is found from the virtual channel identifier (VCI). After step 5, the processing is continued in parallel fashion so that in step 6 it is determined whether the cell is going to output 1, 2 or n. If it is, then step 7 is performed to increment the relevant shaper multicast counter by one. If the cell is not going to a respective output, then it is returned to the input/output process, step 1.

At this point multicast cells have been received, stored and from the information in the shaper counters, the required bandwidth may be requested. This can be achieved by summing a number of unicast cells in the queue with the value of the counter. The value provides the aggregate bandwidths required to cross the switch core.

Figure 11A:
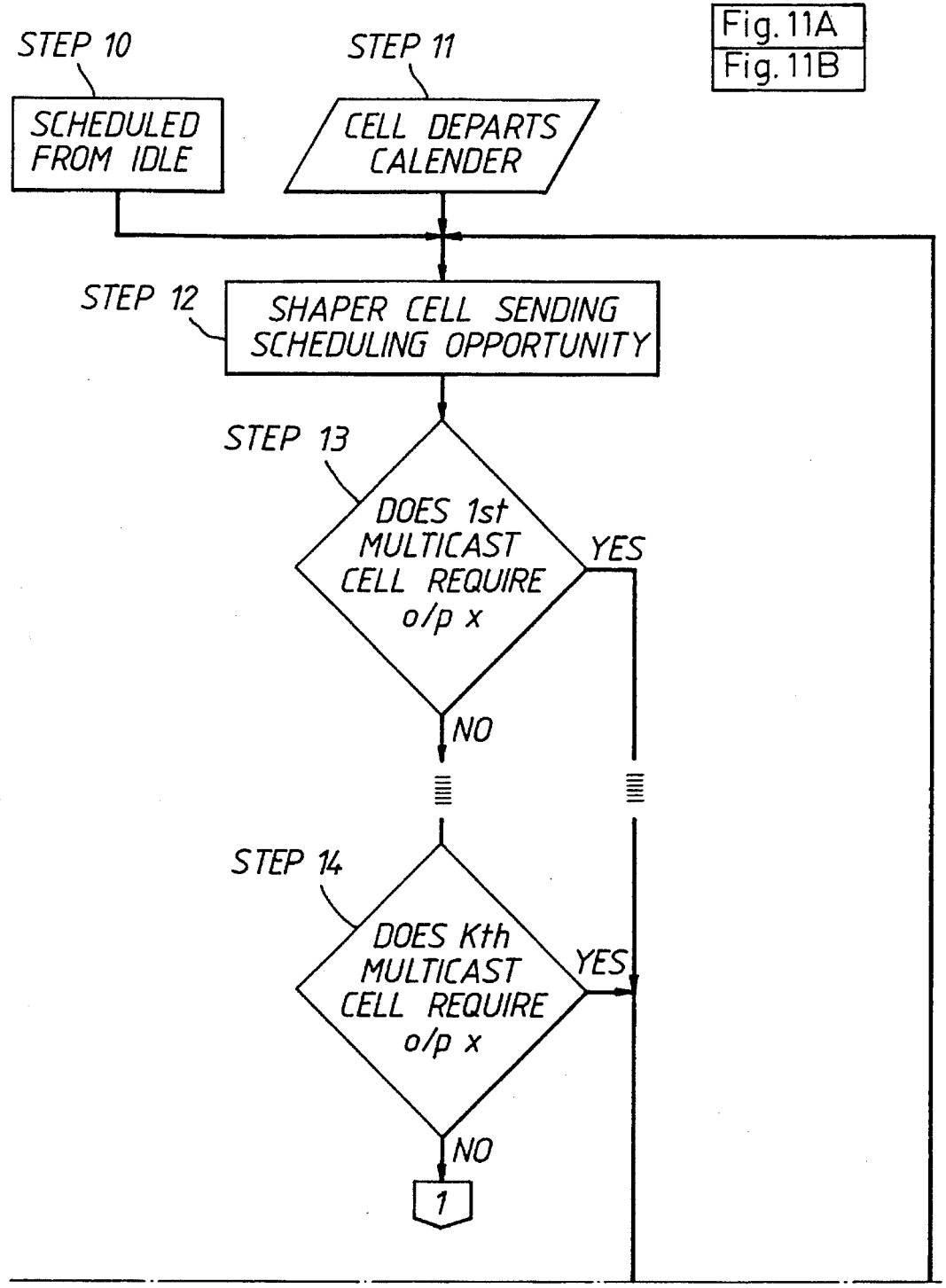
FIG. 11 is a flow diagram for each shaper of the multicast scheduling process of the present invention.
Figure 11B:
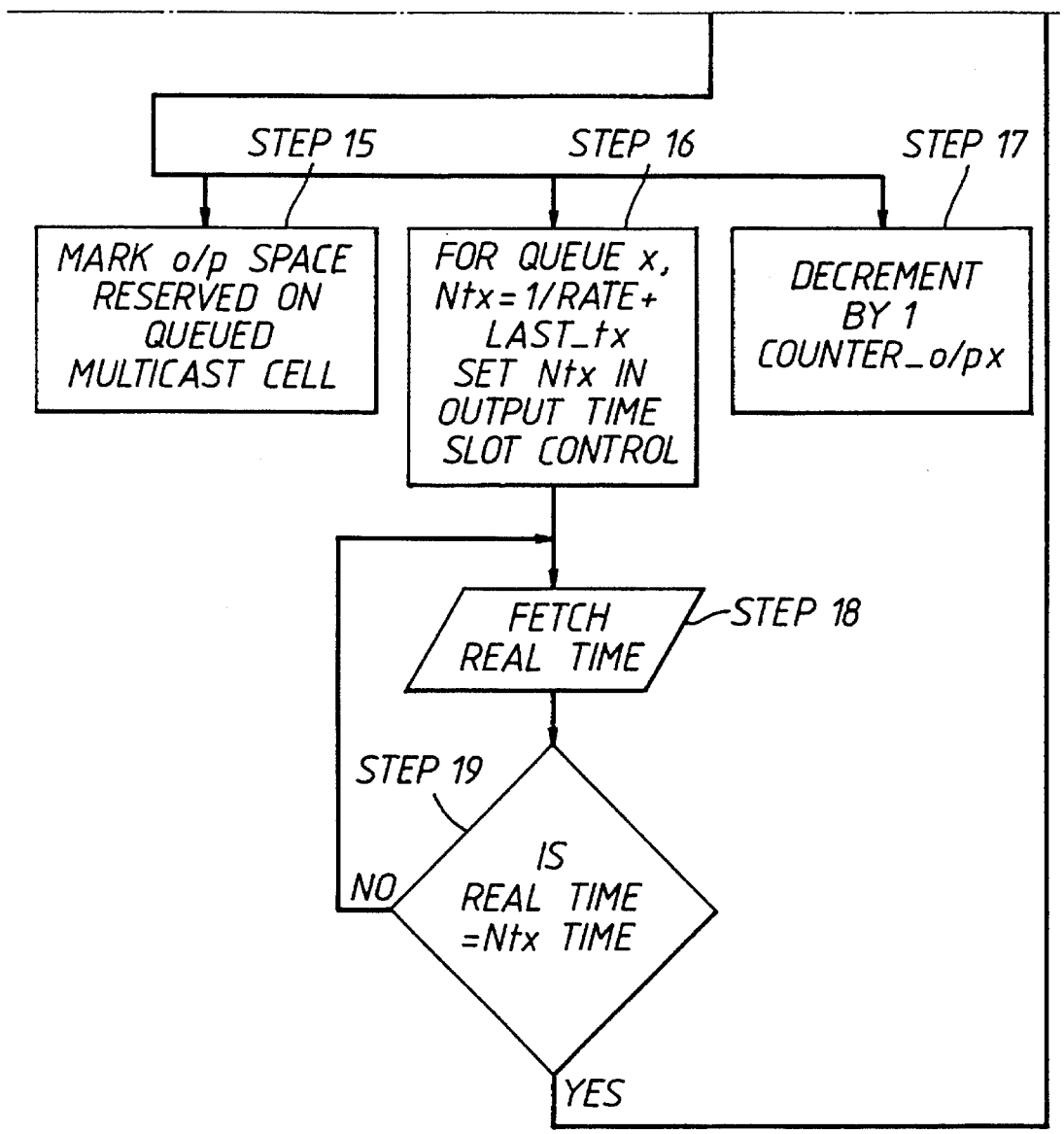

Referring to FIG. 11, a flow diagram is implemented for each shaper. The three actions which may cause a cell sending opportunity are:

(1) A unicast cell previously scheduled from the shaper departs from the calendar causing a scheduling event to occur.

(2) Cell arrival in a unicast queue when the shaper is idle but with a rate reserved between the shaper and the output port, and when no multicast cell in the forward multicast list requires it.

(3) A multicast cell that has previously claimed the bandwidth opportunity, and the next sending opportunity is now available to be scheduled (this is shown by the real time=Ntx time decision in step 19 of FIG. 11).

Figure 12:
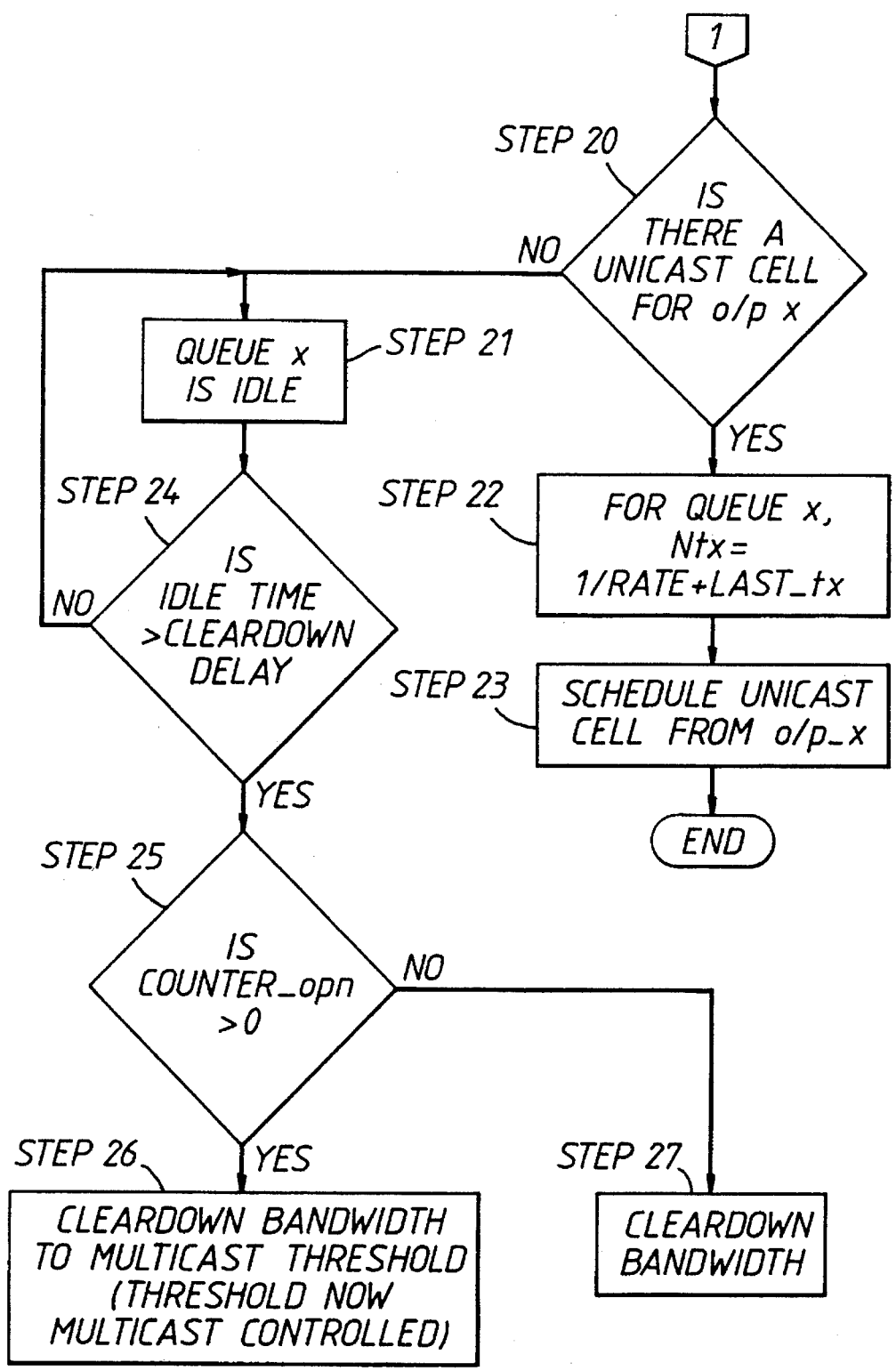
FIG. 12 is a flow diagram for each shaper of the unicast scheduling process of the present invention.

Referring to FIG. 11, step 10 refers to the scheduling from the idle state. In step 1 the cells are received, and in step 12 the cells are checked against the forward list of the multicast cells to see if the sending opportunity is needed. Steps 13, 14 determine whether the first to the kth multicast cell requires an output. If not, the flow diagram of FIG. 12 is followed and will be described in detail later with respect to processing a unicast cell. If, during steps 13 to 14 a multicast cell does require an output, then three parallel actions take place as shown in steps 15, 16 and 17. In step 15 the output space reserved on queued multicast cell is marked. In step 17 the output X counter is decremented by one and step 16, 18 and 19 cause the value Ntx to be compared against the real time until they are equal. At which time a new source sending opportunity is available. During the time that the shaper is in this wait state, a cell cannot be scheduled on the calendar from the shaper. Also, if the shaper queue is idle a cell arrival cannot, cause a schedule opportunity.

Referring to FIG. 12, it is shown that from the multicast cell stage, if no multicast cell requires the bandwidth, the unicast cell may be scheduled on the calendar, or alternatively the shaper queue may become idle. If a unicast cell is available for output then steps 20, 22 and 23 are performed.

Once bandwidth has been reserved, the cells must be scheduled for transmission based on the switch ingress rate, the bandwidth provided between the shaper on an input and the output and the last time at which a cell was sent.

A calendar is used, populated with the next available transmission opportunity for each shaper queue. For shaper queues with a rate set but no cells in the queue, the shaper cannot schedule any cell transmission events and so the queue stands idle. Any cell arrival will be scheduled immediately when the queue is in this state. A multicast cell may also use the idle bandwidth.

When a queue is idle, step 21, there is a period of time termed the Cleardown Delay, step 24, which is a wait state. During this wait state, a cell may arrive in the unicast queue and be treated accordingly as shown in FIG. 11. However, if no cell arrives, multicast traffic has a bearing on the outcome of retained threshold levels. If the value of the multicast counter is greater than zero, step 25, the clear-down that occurs is a partial cleardown. The bandwidth is cleared down to that required by the multicast traffic. Once this has occurred, the threshold levels are termed 'multicast controlled'. Under this multicast controlled state, the value of the multicast counter may rise or fall, and unicast cells may arrive in the unicast queue. So long as a threshold is not passed in the upward direction, the unicast queue may fill and empty without causing a further cleardown event to occur. However, if a threshold is passed in the upward direction then:

(1) If this is caused by multicast traffic only, a new rate may be requested but the thresholds will remain multicast controlled step 26.

(2) If there are cells in the unicast queue when the threshold is passed, the rate may be requested but the thresholds will revert to unicast control. Therefore, if the unicast queue empties, a bandwidth cleardown will again occur, step 27.

The reason for this is that if a multicast buffer empties, a very high bandwidth may be retained for a shaper with only a small multicast counter value made up of multicast cells suffering from head of line blocking, possibly caused by the high bandwidth retained by the shaper. By partially clearing down the bandwidth, the 'spare' bandwidth may be utilized elsewhere; however, the multicast traffic will still retain sufficient bandwidth.

This can be explained by way of the following example. It is assumed that a shaper receives a large unicast burst and requests and receives the full switch rate. In addition, the shaper has a component of multicast traffic recorded in the multicast counter. If in this situation the multicast cells are in the multicast queue, but not in the Forward List of Multicast cells, then the unicast traffic will be sent out at the full link rate. Once the shaper queue has emptied, the rate should still be held at the full link rate because the associated multicast counter value is not zero. This will cause a block to requesting bandwidth for other shapers and must thus be cleared down. However, the rate should only be cleared down to the threshold required by the multicast traffic, termed a 'Partial Cleardown'. This then releases bandwidth which can be used by other shapers.

However, this is not the full answer. The shaper thresholds and rates are calculated to provide a 'flat' response from any threshold point. If the situation is considered from where the shaper queue has emptied and a Partial Cleardown occurred, some of the multicast cells may be transmitted and then a small burst of unicast cells may arrive. If the unicast traffic empties from the shaper queue before all the multicast traffic, then a further partial cleardown may occur. The threshold and therefore rate retained may be lower than previously for the same multicast cells. This will cause a greater delay to the multicast cells because effectively, as the number of multicast cells reduces, then so will the threshold and associated rate. This must not be allowed to happen because the rate at which multicast traffic leaves the switch will become increasingly lower. Therefore, the shaper thresholds and rates must have two controls, either unicast control or multicast control.

The shapers will normally be unicast controlled; however, under the condition when the shaper queue is empty but the multicast counter is non-zero and a partial cleardown has occurred, the shaper will become multicast controlled. In this mode if unicast cells arrive, and the shaper queue empties before the multicast traffic, no cleardown of any type is sent unless a threshold level has been exceeded. This is explained in FIG. 12.

In order for multicast cells to be sent, shaper sending opportunities to all the required output switches for a particular multicast cell must be reserved first. A list of required outputs for each multicast cell is held for the first K multicast cells, called the Forward Multicast List. This list has a fixed length. Cells are promoted from the multicast queue to the Forward Multicast List when a multicast cell is transmitted. A cell sending opportunity for a shaper is first offered to the multicast traffic, if none of the multicast cells in the Forward Multicast List require it, the cell sending opportunity may be used to schedule a unicast cell. This method provides priority to multicast traffic.

If the cell sending opportunity is required by a multicast cell, then once met, the requirement for bandwidth to that output must be tagged to show the bandwidth has been granted. The cell sending opportunity must still be scheduled (using Ntx for multicast cells as explained above) to provide a prompt for the next scheduling opportunity from the shaper. Once all the cell opportunities for a multicast cell have been sated, the cell may be scheduled onto the calendar for transmission. This process is shown in FIG. 13.

Figure 13:
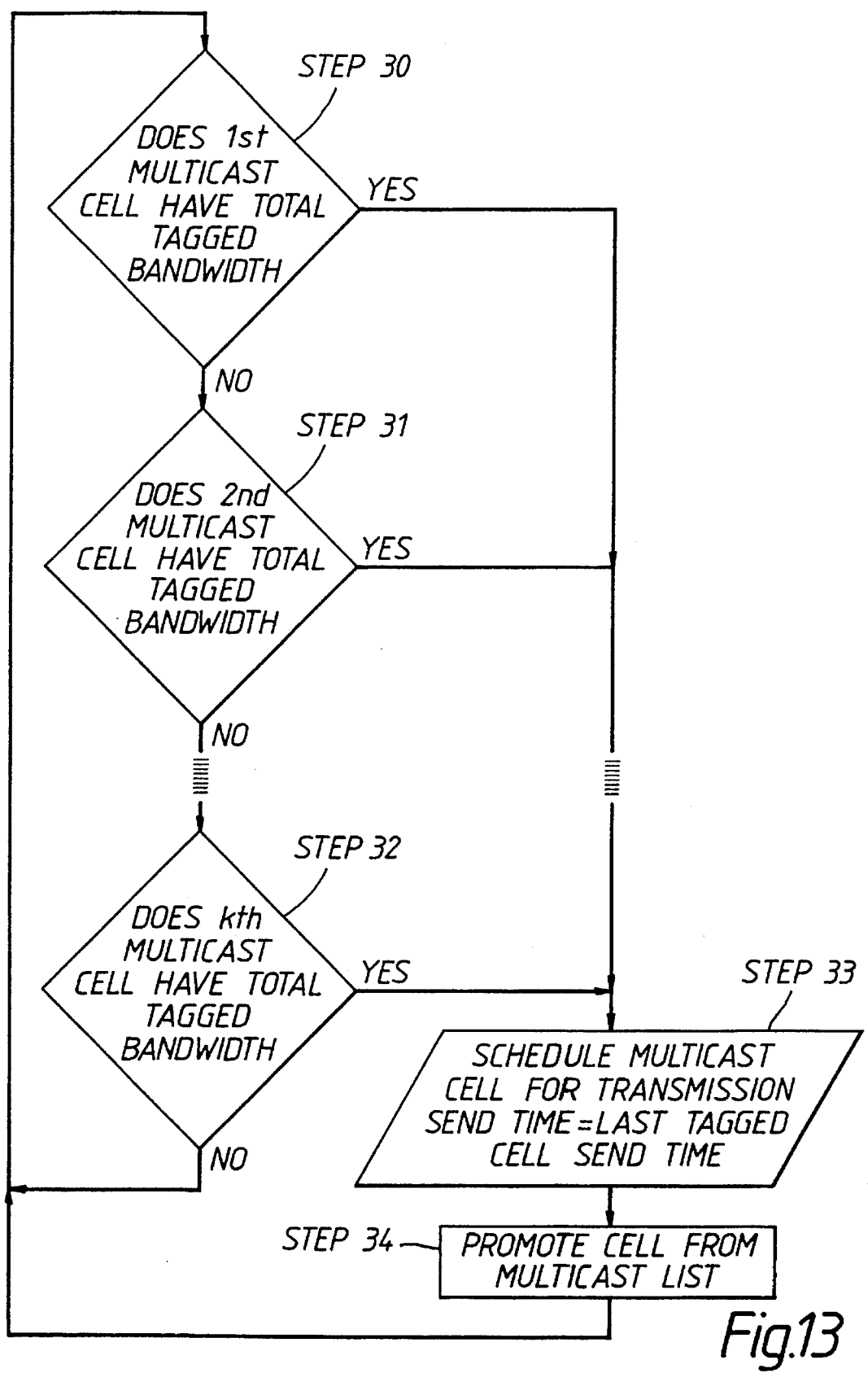
FIG. 13 is a flow diagram of the cell sending process of the present invention.

In FIG. 13, steps 30–32 determine which of the multicast cells have a total tagged bandwidth. Once a cell does have a total tagged bandwidth, the multicast cell is scheduled for transmission, step 33, and at step 34 the cell is promoted from the multicast list.

The scheduling calendar will contain either unicast or multicast cells. The cells assigned to a specific calendar slot are transferred from the calendar to an output (first in first out) FIFO. From there they are transmitted, one in each cell slot. The output FIFO may receive several cells from one calendar slot. Each cell requires a single cell slot to transfer it. This may cause a delay between the calendar scheduled time for sending a cell and the real time of cell transmission. This process will be compensated for by some calendar slots which are empty. Unicast cells are transmitted and at the same time a cell from the corresponding shaper is scheduled to replace it on the calendar. Because multicast cells are scheduled using a different scheme, the sending of a multicast cell does not cause a scheduling opportunity.

It will be appreciated by those skilled in the art that alternative ways of implementing the present invention are possible without departing from the scope of the invention.

Although other modifications and changes may be suggested by those skilled in the art, it is the intention of the inventors to embody within the patent warranted hereon all changes and modifications as reasonably and properly come within the scope of their contribution to the art.

We claim:

1. An ATM communication system comprising:

an ATM switch having a plurality of input ports and a plurality of output ports, each of the input ports being fed from an input port server and each of the output ports being arranged to feed an output port server, the input port servers having a plurality of buffer stores, one for each of the output ports, to which said output ports data is transmitted through the switch, each of said plurality of buffer stores in the input port servers arranged to interrogate the output ports server with which it communicates before the transmission of data to determine whether output port server data handling capacity is available; and means for causing unicast traffic and multicast traffic to be transmitted through the switch in an appropriate time slot.

2. The system of claim 1, wherein said means for causing unicast traffic and multicast traffic to be transmitted through the switch in an appropriate time slot includes output time slot control means and scheduling means arranged to allocate a time slot for the transmission of each unicast traffic cell, and for calculating when a time slot is available for the transmission of a multicast traffic cell.

3. The system of claim 2, wherein the output time slot control means further comprises:

a storage arrangement for storing information identifying the time slot for the transmission of a multicast traffic cell.

4. A method of scheduling transmission of unicast and multicast ATM traffic cells in an ATM switch, wherein said method comprising the steps of:

determining from the VCI of each multicast traffic cell which of a plurality of output ports the multicast cell is to be transmitted;

incrementing a counter associated with each output port for every multicast traffic cell to be sent to that output port;

allocating bandwidth sufficient to transmit the traffic cells across the ATM switch in accordance with the content of the counters;

scheduling a time slot for the transmission of each unicast traffic cell;

calculating when a time slot is available for the transmission of a multicast traffic cell in accordance with the bandwidth allocated;

storing the identity of the time slot available for a multicast traffic cell to reserve that time slot for multicast traffic; and transmitting the unicast and multicast traffic cells across the switch in their respective time slots.

* * * * *